2,894,013
PROCESS FOR PREPARING ALIPHATIC ISOTHIOCYANATES

Horst Werres, Berlin-Charlottenburg, Germany, assignor to Schering A.G., Berlin, Germany, a corporation of Germany No Drawing. Application February 24, 1958
Serial No. 716,895

Claims priority, application Germany March 18, 1957

6 Claims. (Cl. 260—454)

This invention relates to the production of aliphatic isothiocyanates, and to a novel process for preparing aliphatic isothiocyanates which involves treating N-alkyldithiocarbamates with phosgene.

Aliphatic isothiocyanates have found extensive use in combatting pests, and in particular, methyl isothiocyanate has proved to be well suited for the destruction of soil nematodes.

Numerous methods are already known for the preparation of isothiocyanates. Thus, for example, isothiocyanates can be prepared by the inversion of thiocyanic acid esters of the formula RSCN. Further, mustard oils can be obtained by the treatment of N-monosubstituted alkyldithiocarbamates with salts of heavy metals. Another method of preparation of isothiocyanates lies in the action of thiophosgene upon amines. In addition, aromatic isothiocyanates can be obtained from thiocarbanilides by treatment with concentrated hydrochloric acid. Still another route is via the isonitriles, from which mustard oils can be obtained by the action of sulfur. It is possible to convert dithiocarbamates into mustard oils by treatment with oxidizing agents, in the presence of heavy metal salts. Moreover, mustard oils can be prepared from dithiocarbamates and cyanogen chloride. Another method is the conversion of thioureas with carbon bisulfide at elevated temperatures. This process, however, requires the use of pressure, which results in increased difficulty in industrial operations. Besides these methods, it is known that organic isothiocyanates can be prepared by conversion of N-monosubstituted dithiocarbamic acids or their salts with hypochlorites in the presence of a solvent. This method results in good yields only in the case of the higher mustard oils, however, and in several tests to use it for the preparation of methyl isothiocyanate, yields of only 20 to 21 percent were obtained. Moreover, this last process requires extraordinarily large amounts of solvent, a disadvantage which is not found in the novel method of the present invention as disclosed below.

Another known process for the preparation of isothiocyanates consist in reacting dithiocarbamates with esters of chlorformic acid in aqueous media. The products which are obtained according to this process, are, however, very impure. Although in the literature yields of from 70 to 76 percent are set forth in the preparation of methyl isothiocyanate, these yields have in general proved unattainable. The product obtained by this process is moreover partly liquid and partly solid and exhibits a carbon content which is about 10 percent too high.

It is further known that aromatic isothiocyanates can be obtained by conversion of the corresponding dithiocarbamic acid ammonium salts with phosgene in an anhydrous medium. Anhydrous toluene is principally used as a solvent for this purpose.

It was now found, in accordance with this invention, that aliphatic isothiocyanates can also be prepared by conversion of N-alkyldithiocarbamates with phosgene.

It could not have been predicted, however, that this reaction, which was applicable to the aromatic isothiocyanates, would ipso facto be equally successful with the aliphatic isothiocyanates. The discovery that it could be used to prepare the aliphatic isothiocyanates was both surprising and unexpected. Thus, for example, it was surprising to find that the reaction in the case of aliphatic isothiocyanates need not be conducted in an anhydrous medium but can also be carried out in an aqueous medium In fact the reaction in the case of aliphatic isothiocyanates is carried out more advantageously in aqueous solutions than in organic solvents. The carrying out of the reaction in aqueous solutions was especially unpredictable since phosgene hydrolyzes in water. Hence the reaction of the phosgene in accordance with the novel process of this invention must be deemed to take place in aqueous media in accordance with the equation:

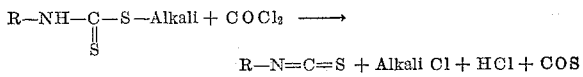

$$R-NH-\underset{\underset{S}{\|}}{C}-S-\text{Alkali} + COCl_2 \longrightarrow$$
$$R-N=C=S + \text{Alkali Cl} + HCl + COS$$

wherein R may signify an alkyl radical, such as, for example $CH_3$ and $C_2H_5$, an alkali can be sodium, or potassium ammonium.

This novel reaction also is well suited for the preparation of methyl isothiocyanate, which is of special importance on account of its value as an agent for destruction of nematodes.

The principal advantage of the process of this invention lies in that a very pure product is obtained directly. Furthermore, operating with water is more economical than using organic solvents. A further advantage is found in that all soluble carbamates can be used, such as, for example, the sodium salts of the corresponding dithiocarbamic acids. It is therefore a particularly favorable factor that the solubility of the alkali salts of dithiocarbamic acid is quite good; this permits the further advantage of operating in a homogeneous phase. By performing this reaction as an aqueous medium there is no necessity for the exclusion of moisture, and the drying of the starting material which is necessary in the preparation of aromatic isothiocyanates by conversion of the corresponding dithiocarbamic acid ammonium salt with phosgene in anhydrous media, is wholly avoided. In addition, there may be utilized for the process of the present invention readily accessible starting materials. In comparison with the previously mentioned reaction of dithiocarbamic acid salts with chloroformic acid esters, the novel process of this invention has the further advantage that phosgene is used instead of the chloroformic acid esters. The chloroformic acid esters would otherwise have to be prepared from phosgene and alcohol.

The novel process of this invention may be illustrated by the following examples, which are not, however, to be regarded as limiting.

EXAMPLE 1

(a) *Preparation of sodium N-methyldithiocarbamate*

The apparatus consists of a one liter round triple necked flask equipped with reflux condenser, thermometer, KPG-stirrer, and dropping funnel. Into this flask there were placed 110 cc. or 137 g. of carbon bisulfide and a cold solution of 72 g. of sodium hydroxide in 160 g. of water, and then there were added dropwise in the course of about 30 minutes, 184 cc. or 55.8 g. of methylamine in the form of commercial 33% methylamine solution. The internal temperature was held at below 25° by occasional stirring. The stirring was continued until a clear reddish solution had formed. For this a period of from 1 to 2 hours is required. The total volume of the solution thus obtained amounted to about 440 cc.

(b) Preparation of methyl isothiocyanate

The apparatus consisted of a one liter round three-necked flask with reflux condenser, stirrer, thermometer, and inlet tube for phosgene. The phosgene cylinder is weighed during the introduction and the phosgene is also passed through a flow meter and through a safety flask and thence through the inlet tube into the flask. Beyond the reaction flask there is provided an absorption vessel for the COS that is formed, such as, for example, a bottle filled with alcoholic ammonia. In the above obtained solution, while maintaining an internal temperature of 50°, there are introduced 195 g. of phosgene during a period of about 3 hours. Thereupon the solution is stirred for one additional hour and the oil obtained is then separated. The separation can be carried out either directly or by ether extraction. It is desirable to add about 200 cc. of water to dissolve any sodium chloride which has separated. The product thus obtained is dried with sodium sulfate and distilled at normal pressure through a column of about 10 cm. length which is packed with Raschig rings. The boiling point of the main fraction lies between 115° and 118°. A small additional fraction is obtainable, whereupon the boiling temperature drops to about 104°. The receivers for the runnings are cooled with ice water. In order to avoid crystallizing out in the condenser, the latter is cooled only with a weak stream of air or not at all. The yield of pure mustard oil amounts to 65.3 g. or 51.8%, on the basis of about a 96% sodium N-methyldithiocarbamate, as determined by analysis. The melting point of the obtained product, without further purification, lies between 36.0° and 37.0°. The yield in further runs was between 51 and 56 percent.

EXAMPLE 2

(a) Preparation of sodium N-ethyldithiocarbamate

The same apparatus as is described in Example 1(a) may be used. There are placed in the flask 55 cc. or 68.4 g. of carbon bisulfide and a caustic soda solution prepared from 36 g. NaOH and 80 g. of water. Then there are added dropwise in the course of 25 minutes, 40.5 g. of ethylamine dissolved in 82 g. of water. The internal temperature is maintained at 25° by periodic cooling. After about 1 to 2 hours of stirring there is obtained a light red, clear solution.

(b) Preparation of ethyl isothiocyanate

The apparatus used corresponds to that described in Example 1(b).

Into the solution obtained in (a) there were introduced at 50° in the course of 1.5 hours, 97 g. of phosgene. After about 16 minutes the separation of an oil takes place. After the introduction of the phosgene, the stirring is continued for another hour. After this, the precipitated sodium chloride is brought into solution by the addition of about 100 cc. water and the separated oil is taken up with about 150 cc. of ether. The ether solution is dried with sodium sulfate and the ether distilled off through a column. There remains as a residue 61.9 g. of a yellow colored oil. This oil is then fractionally distilled at normal pressure through a short column. The main runnings boil at 130° to 131.5°. The yield comprises 37.05 g. or 47.4% of the theoretical.

I claim:

1. Method for the preparation of lower aliphatic isothiocyanates which comprises reacting a soluble salt of an N-alkyldithiocarbamic acid with phosgene in an aqueous medium wherein alkyl is lower alkyl.

2. Method for the preparation of lower aliphatic isothiocyanates which comprises reacting an alkali metal salt of an N-alkyldithiocarbamic acid with phosgene in an aqueous medium wherein alkyl is lower alkyl.

3. Method for the preparation of methyl isothiocyanate which comprises reacting an alkali metal salt of N-methyldithiocarbamic acid with phosgene in an aqueous medium.

4. Method for the preparation of methyl isothiocyanate which comprises reacting sodium N-methyldithiocarbamate with phosgene in an aqueous medium.

5. Method for the preparation of ethyl isothiocyanate which comprises reacting an alkali metal salt of N-ethyldithiocarbamic acid with phosgene in an aqueous medium.

6. Method for the preparation of ethyl isothiocyanate which comprises reacting sodium N-ethyldithiocarbamate with phosgene in an aqueous medium.

References Cited in the file of this patent

FOREIGN PATENTS 678,125   Great Britain _____ Aug. 27, 1952

OTHER REFERENCES

Rodd: Chemistry of Carbon Compounds, vol. 1, part B (Aliphatic Compounds), 1952, pp. 892 and 898.